US012106519B2

(12) United States Patent
Qiu

(10) Patent No.: US 12,106,519 B2
(45) Date of Patent: Oct. 1, 2024

(54) ASTRONOMICAL TELESCOPE STAND, AUXILIARY CALIBRATION METHOD FOR ASTRONOMICAL TELESCOPE AND ASTRONOMICAL TELESCOPE SYSTEM

(71) Applicant: Light Speed Vision (Beijing) Co., Ltd., Beijing (CN)

(72) Inventor: Hongyun Qiu, Beijing (CN)

(73) Assignee: Light Soeed Vision (Beijing) Co., Ltd., Beijing (CN)

( * ) Notice: Subject to any disclaimer, the term of this patent is extended or adjusted under 35 U.S.C. 154(b) by 389 days.

(21) Appl. No.: 17/749,328

(22) Filed: May 20, 2022

(65) Prior Publication Data

US 2023/0154045 A1 May 18, 2023

(30) Foreign Application Priority Data

Nov. 13, 2021 (CN) .......................... 202111343629.2

(51) Int. Cl.
*G06T 7/80* (2017.01)
*G02B 23/16* (2006.01)
*H04N 7/18* (2006.01)

(52) U.S. Cl.
CPC ................ *G06T 7/80* (2017.01); *G02B 23/16* (2013.01); *H04N 7/18* (2013.01); *G06T 2207/10032* (2013.01)

(58) Field of Classification Search
CPC ... G06T 7/80; G06T 2207/10032; G06T 5/80; G06T 7/73; G02B 23/16; G02B 23/00; H04N 7/18; H04N 7/183
See application file for complete search history.

(56) References Cited

U.S. PATENT DOCUMENTS

| 5,133,050 A | * | 7/1992 | George | ................ G02B 23/00 345/9 |
| 2004/0233521 A1 | * | 11/2004 | McWilliams | .......... G02B 23/16 359/399 |

(Continued)

FOREIGN PATENT DOCUMENTS

CN        1798997 A        7/2006

OTHER PUBLICATIONS

First Office Action cited in corresponding Chinese patent Application No. 202111343629.2, dated Dec. 28, 2023, 12 pages.

*Primary Examiner* — Solomon G Bezuayehu
(74) *Attorney, Agent, or Firm* — Cooper Legal Group, LLC

(57) ABSTRACT

Disclosed are an astronomical telescope stand, an auxiliary calibration method for the astronomical telescope and an astronomical telescope system. The astronomical telescope includes at least two rotating shafts perpendicular to each other, each rotating shaft is provided with an encoder; an electronic camera shooting in the same direction as the telescope to be mounted; a display screen; a processor that connects with the encoder, the electronic camera and the display screen; the processor includes an image information parsing module, an electronic image generation module and a coordinate correction module. The telescope is mounted on the stand, and the electronic camera shoots the same image as the image observed by the telescope. The image information parsing module solves the image to obtain the center coordinate and the field size of the image. The electronic image generation module generates the simulated image according to the center coordinate and the field size.

16 Claims, 3 Drawing Sheets

(56) References Cited

U.S. PATENT DOCUMENTS

2006/0158722 A1\* 7/2006 Fujimoto ............... G02B 23/00
  359/399
2018/0210062 A1\* 7/2018 Qiu ...................... G02B 23/165
2019/0387181 A1\* 12/2019 Qiu ...................... H04N 5/2628

\* cited by examiner

ASTRONOMICAL TELESCOPE STAND, AUXILIARY CALIBRATION METHOD FOR ASTRONOMICAL TELESCOPE AND ASTRONOMICAL TELESCOPE SYSTEM

CROSS-REFERENCE TO RELATED APPLICATION

The present application claims the priority to Chinese patent application No. 202111343629.2, filed on Nov. 13, 2021. The entirety of Chinese patent application No. 202111343629.2 is hereby incorporated by reference herein and made a part of this specification.

TECHNICAL FIELD

The present application relates to the technical field of the astronomical telescope, in particular to an astronomical telescope stand, an auxiliary calibration method for the astronomical telescope and an astronomical telescope system.

BACKGROUND ART

An astronomical telescope is a tool for human beings to explore starry sky. In recent years, with the development and progress of the technology, more and more amateur astronomers observe the stars by using an astronomical telescope.

The adjustment of the astronomical telescope is difficult. Presently, an astronomical telescope can be calibrated manually or automatically. The manual calibration is difficult and has complicated operations, while the automatic calibration is relatively convenient. However, after the astronomical telescope is displaced by collision, the manual calibration is still required, which involves complicated operations.

SUMMARY

In order to solve the above technical problem, the present application provides an astronomical telescope stand, an auxiliary calibration method for the astronomical telescope and an astronomical telescope system.

An astronomical telescope stand according to the present application adopts the following technical solutions.

The astronomical telescope stand includes:
at least two rotating shafts perpendicular to each other, wherein each rotating shaft is provided with an encoder;
an electronic camera having a same shooting direction as a telescope to be mounted;
a display screen;
a processor, which is connected with the encoders, the electronic camera and the display screen, and the processor includes:
an image information parsing module, configured to calculate a center coordinate and a field size of an image captured by the electronic camera;
an electronic image generation module, configured to generate a simulated star map based on the center coordinate and the field size;
a coordinate correction module, configured to correct the center coordinate based on a deflecting angle of the electronic camera obtained by the encoder to update the simulated star map; and
wherein the simulated star map is displayed on the display screen.

In the above technical solution, the telescope can be mounted on the stand, and the electronic camera can shoot the same image as the image observed by the telescope. The image information parsing module can solve the image to obtain the center coordinate and the field size of the image. The electronic image generation module generates the simulated image according to the center coordinate and the field size. The clear simulated image can be obtained without a calibration step for the telescope. Since some time is needed to solve the image, the coordinate correction module can calculate the observing image of the telescope according to the rotating angle of the telescope, and output the calculated center coordinate to the electronic image generation module, so as to update the display image in real time.

In some embodiments, the simulated star map includes at least one of an astronomical serial number of a star point, a name of a star point, an astronomical coordinate of a star point, brightness of a star point, a profile of a constellation and a name of a constellation.

In the above technical solution, an observer can intuitively obtain the star information, and it is convenient to study for the observer.

In some embodiments, the display screen is connected with a rotating shaft via a connecting rod, one end of the connecting rod is hinged with the rotating shaft, and the other end of the connecting rod is hinged with the display screen.

In the above technical solution, a position and display angle of the display screen can be adjusted, so that the display screen can be at a similar position and angle to the eyepiece.

In some embodiments, the center coordinate is expressed as an equatorial coordinate, and the deflecting angle is expressed as a horizontal coordinate, and the coordinate correction module includes:
a deflecting angle acquisition unit, configured to obtain a deflecting angle of the electronic camera;
an angle conversion unit, configured to convert the deflecting angle to a center point deflecting angle in a form of equatorial coordinate, and correct the center coordinate based on the center point deflecting angle; and
wherein the coordinate correction module transmits the corrected center coordinate to the electronic image generation module.

In the above technical solution, the deflecting angle acquisition unit and the angle conversion unit can convert the deflecting angle in a form of a horizontal coordinate to a center point deflecting angle in a form of an equatorial coordinate, so as to correct the center coordinate.

In some embodiments, the astronomical telescope stand further includes a storage module that pre-stores star catalog data, wherein the star catalog data at least includes: an astronomical serial number of a star point, a name of a star point, an astronomical coordinate of a star point, brightness of a star point, a profile of a constellation, a name of a constellation; and wherein the electronic image generation module is configured to calculate a star sky scope that is viewed by the electronic camera currently based on the center coordinate and the field size, and acquire star catalog data from the storage module based on the star sky scope, to acquire star point data related in the star sky scope.

In the above technical solution, the storage module provides an astronomical information database for the image information parsing module and the electronic image generation module, which is convenient for the information acquisition.

In some embodiments, a display mode of the display screen includes a panoramic mode, an AR mode and a comparison mode;

in the comparison mode, the display screen includes at least two display areas, and one display area is used to display a simulated star map, and the other display area is used to display an image captured by the electronic camera or captured by a telescope mounted on the stand.

In the above technical solution, various display modes provide different observing feelings for the observer. The panoramic mode can give the observer an immersive feeling, and the AR mode enables the observer to intuitively obtain the information of star, and the comparison mode is convenient for the observer to compare the image shot by the electronic camera or the telescope with the simulated star map.

In some embodiments, the electronic image generation module is configured to:

generate a simulated star map based on a center coordinate and a field size output by the image information parsing module when a center coordinate output by the image information parsing module is received; and generate a simulated star map based on a center coordinate and a field size output by the coordinate correction module when a center coordinate output by the image information parsing module is not received.

In the above technical solution, the speed of calculating the coordinate correction module to obtain the central coordinate is faster than the speed of solving the image information parsing module to obtain the central coordinate. Thus, the electronic image generation module updates the simulated star map according to the center coordinate of the coordinate correction module, and calibrate the simulated star map according to the center coordinate obtained by the image information parsing module, so that the simulated star map can be updated in real time, and highly matched with the image shot by electronic camera or the telescope.

In some embodiments, the processor is communicated with an astronomical information database via Internet, or communicated with processors of other astronomical telescopes; the processor is configured to acquire or generate a required simulated star map by means of the astronomical information database communicated via Internet, or acquire or generate a required simulated star map from other astronomical telescopes communicated with the processor.

In the above technical solution, the star information can be obtained from the astronomical information database, which provides a resource support for the generation of simulated star map. The present application can be communicated with other telescopes, so that the observer can observe stars at different positions from one position, which provides great convenience for the observation.

Second, the present application provides an auxiliary calibration method for an astronomical telescope, which adopts the following technical solutions:

configuring an astronomical telescope stand, the astronomical telescope stand is provided with an electronic camera and a display screen, wherein the electronic camera has a same shooting direction as a telescope to be mounted;

determining a shooting scope of the electronic camera at present according to an image shot by the electronic camera currently;

determining star point information of the electronic camera at present according to the shooting scope; and generating a simulated star map according to the star point information, and displaying the simulated star map on the display screen to assist in searching for stars.

In the above technical solution, the electronic camera shoots the same image as the telescope, and the shooting scope of the electronic camera is analyzed. The simulated star map is generated according to the star point information within the shooting scope, and the calibration step for the telescope is omitted. The stars are observed through the simulated star map. It can reduce the effect of weather on observation and provide convenience for the star observer.

Third, the present application provides an astronomical telescope system, which adopts the following technical solutions.

The astronomical telescope system includes a telescope and a telescope stand for mounting the telescope. In particular, the telescope stand comprises:

at least two rotating shafts perpendicular to each other, wherein each rotating shaft is provided with an encoder;

an electronic camera having a same shooting direction as a telescope to be mounted;

a display screen;

a processor, which is connected with the encoders, the electronic camera and the display screen, and the processor includes:

an image information parsing module, configured to calculate a center coordinate and a field size of an image captured by the electronic camera;

an electronic image generation module, configured to generate a simulated star map based on the center coordinate and the field size;

a coordinate correction module, configured to correct the center coordinate based on a deflecting angle of the electronic camera obtained by the encoder to update the simulated star map; and wherein the simulated star map is displayed on the display screen.

In the above technical solution, in the astronomical telescope system, the telescope can be mounted on the stand, and the electronic camera can shoot the same image as the image observed by the telescope. The image information parsing module can solve the image to obtain the center coordinate and the field size of the image. The electronic image generation module generates the simulated image according to the center coordinate and the field size. The clear simulated image can be obtained without a calibration step for the telescope. Since some time is needed to solve the image, the coordinate correction module can calculate the observing image of the telescope according to the rotating angle of the telescope, and output the calculated center coordinate to the electronic image generation module, so as to update the display image in real time.

In some embodiments, the simulated star map comprises at least one of an astronomical serial number of a star point, a name of a star point, an astronomical coordinate of a star point, brightness of a star point, a profile of a constellation and a name of a constellation.

In the above technical solution, the observer can intuitively obtain the star information, and it is convenient to study for the observer.

In some embodiments, the display screen is connected with a rotating shaft via a connecting rod, one end of the connecting rod is hinged with the rotating shaft, and the other end of the connecting rod is hinged with the display screen.

In the above technical solution, a position and display angle of the display screen can be adjusted, so that the display screen can be at a similar position and angle to the eyepiece.

In some embodiments, the center coordinate is expressed as an equatorial coordinate, and the deflecting angle is expressed as a horizontal coordinate, and the coordinate correction module includes:
  a deflecting angle acquisition unit, configured to obtain a deflecting angle of the electronic camera;
  an angle conversion unit, configured to convert the deflecting angle to a center point deflecting angle in a form of equatorial coordinate, and correct the center coordinate based on the center point deflecting angle; and
  wherein the coordinate correction module transmits the corrected center coordinate to the electronic image generation module.

In the above technical solution, the deflecting angle acquisition unit and the angle conversion unit can convert the deflecting angle in a form of a horizontal coordinate to a center point deflecting angle in a form of an equatorial coordinate, so as to correct the center coordinate.

In some embodiments, the astronomical telescope stand further includes a storage module that pre-stores star catalog data, wherein the star catalog data at least comprises: an astronomical serial number of a star point, a name of a star point, an astronomical coordinate of a star point, brightness of a star point, a profile of a constellation, a name of a constellation; and wherein the electronic image generation module is configured to calculate a star sky scope that is viewed by the electronic camera currently based on the center coordinate and the field size, and acquire star catalog data from the storage module based on the star sky scope, to acquire star point data related in the star sky scope.

In the above technical solution, the storage module provides an astronomical information database for the image information parsing module and the electronic image generation module, which is convenient for the information acquisition.

In some embodiments, a display mode of the display screen includes a panoramic mode, an AR mode and a comparison mode;
  in the comparison mode, the display screen includes at least two display areas, and one display area is used to display a simulated star map, and the other display area is used to display an image captured by the electronic camera or captured by a telescope mounted on the stand.

In the above technical solution, various display modes provide different observing feelings for the observer. The panoramic mode can give the observer an immersive feeling, and the AR mode enables the observer to intuitively obtain the information of star, and the comparison mode is convenient for the observer to compare the image shot by the electronic camera or the telescope with the simulated star map.

In some embodiments, the electronic image generation module is configured to:
  generate a simulated star map based on a center coordinate and a field size output by the image information parsing module when a center coordinate output by the image information parsing module is received; and
  generate a simulated star map based on a center coordinate and a field size output by the coordinate correction module when a center coordinate output by the image information parsing module is not received.

In the above technical solution, the speed of calculating the coordinate correction module to obtain the central coordinate is faster than the speed of solving the image information parsing module to obtain the central coordinate. Thus, the electronic image generation module updates the simulated star map according to the center coordinate of the coordinate correction module, and calibrate the simulated star map according to the center coordinate obtained by the image information parsing module, so that the simulated star map can be updated in real time, and highly matched with the image shot by electronic camera or the telescope.

In some embodiments, the processor is communicated with an astronomical information database via Internet, or communicated with processors of other astronomical telescopes; the processor is configured to acquire or generate a required simulated star map by means of the astronomical information database communicated via Internet, or acquire or generate a required simulated star map from other astronomical telescopes communicated with the processor.

In the above technical solution, the star information can be obtained from the astronomical information database, which provides a resource support for the generation of simulated star map. The present application can be communicated with other telescopes, so that the observer can observe stars at different positions from one position, which provides great convenience for the observation.

The astronomical telescope stand disclosed in the present application, wherein the telescope can be mounted on the stand, and the electronic camera can shoot the same image as the image observed by the telescope. The image information parsing module can solve the image to obtain the center coordinate and the field size of the image. The electronic image generation module generates the simulated image according to the center coordinate and the field size. The clear simulated image can be obtained without the calibration step for the telescope. Since some time is needed to solve the image, the coordinate correction module can calculate the rotating angle of the telescope to obtain the observing image of the telescope, and output the calculated center coordinate to the electronic image generation module, so as to update the display image in real time.

DETAILED DESCRIPTION

Exemplary embodiments of the present application will be described in detail below with reference to the drawings. It should be noted that, unless otherwise specified, the relative arrangement of the components and the steps, the numerical expression as well as the numerical value described in these embodiments do not limit the scope of the present application.

An astronomical telescope is often required to be calibrated during use. At present, an astronomical telescope can be calibrated in way of an automatic calibration or a manual calibration. The automatic calibration is relatively convenient. However, in a case that the astronomical telescope is collided during use, the manual calibration is still required, the operations of which are difficult and complicated.

Figure 1:
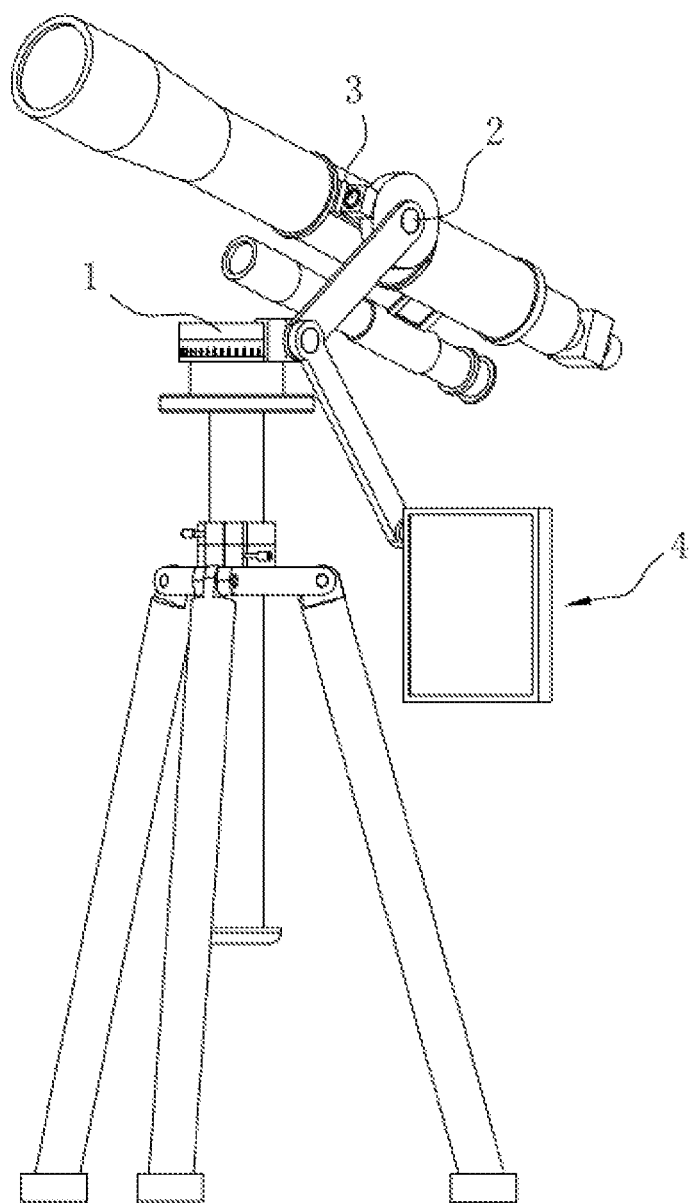
FIG. 1 illustrates an overall structure of an astronomical telescope stand according to an embodiment of the present application.

As illustrated in FIG. 1, an astronomical telescope stand according to the present application includes at least two rotating shafts perpendicular to each other, an electronic camera 3 shooting in the same direction as a telescope to be mounted, and a display screen 4 connecting with one of the rotating shafts via a connecting rod.

The rotating shafts include a first rotating shaft 1 and a second rotating shaft 2. The first rotating shaft 1 can be vertically arranged and connect with a tripod for supporting the stand, so that the astronomical telescope can rotate in a horizontal direction. The second rotating shaft 2 can be horizontally arranged and connect with the first rotating shaft 1 via a connecting rod. The second rotating shaft 2 is used to adjust the orientation of the astronomical telescope in the vertical direction. The connecting rod is respectively hinged with the first rotating shaft 1 and the second rotating shaft 2, which is convenient to adjust the orientation and height of the telescope.

Each rotating shaft is provided with an encoder 5. One end of a connecting rod is hinged with the first rotating shaft 1, and the other end is hinged with a display screen 4, so that a position and display angle of the display screen can be adjusted. The display screen can be at a similar position and angle as an eyepiece. The encoder 5, the electronic camera 3, and the display screen 4 are connected with a processor 6.

When used, a telescope can be mounted on the stand. The electronic camera 3 can capture the same content as the telescope, and send the captured images to the processor 6. The processor 6 generates a simulated star map according to image parameters, and the simulated star map is displayed on the display screen 4. With such simple operations, operations of calibrating telescopes in observing stars are omitted, and the simulated star map can be displayed clearer. The contents displayed in the simulated star map may also include an astronomical serial number of a star point, a name of the star point, an astronomical coordinate of the star point, brightness of the star point, a profile of a constellation, the name of the constellation and etc., which intuitively provides the star information for observers, and thus improves the study efficiency.

Figure 2:
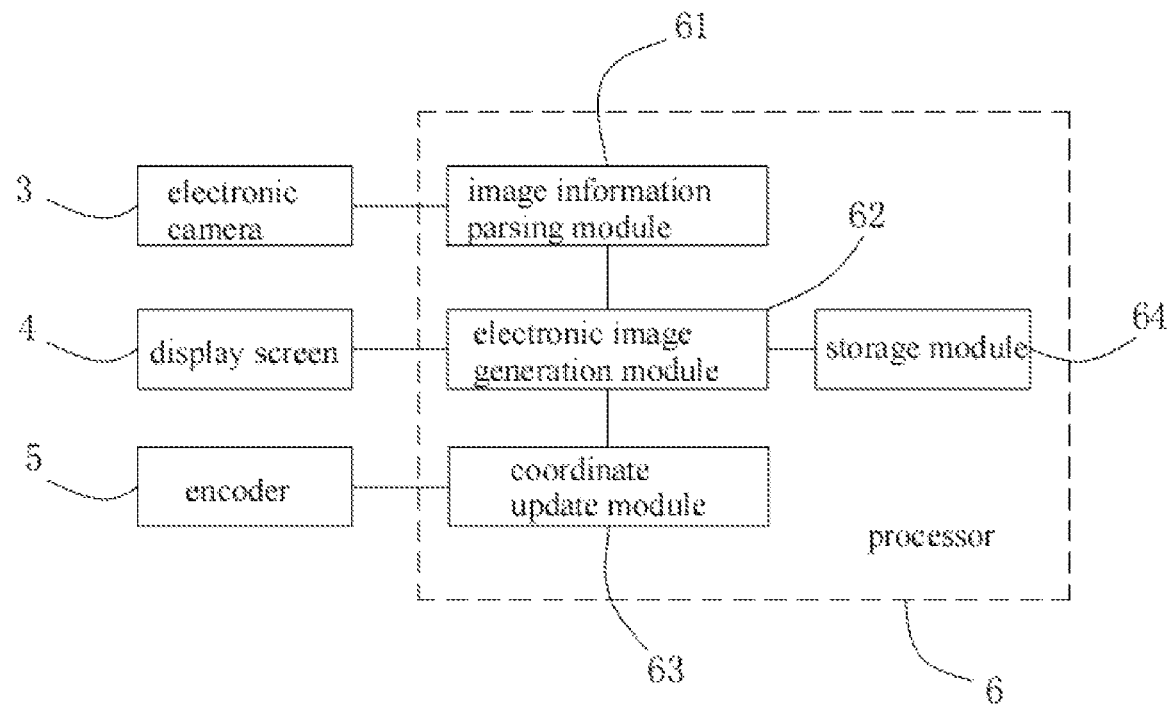
FIG. 2 is a system diagram of the astronomical telescope stand according to the embodiment of the present application.

In an embodiment of the present application, referring to FIG. 2, the processor 6 includes an image information parsing module, an electronic image generation module 62, a coordinate correction module and a storage module.

An astronomical information database is pre-stored in the storage module, which includes star catalog data having star point information. The star catalog data at least includes: astronomical serial numbers of star points, names of star points, astronomical coordinates of star points, brightness of star points, profiles of constellations, and names of constellations.

The image information parsing module can obtain a center coordinate and a field size of an image captured by the electronic camera 3 by parsing the image. Specifically, the image information parsing module identifies characteristic star points at an image center point and edge positions based on an image identification technology, queries position information of the characteristic star points in the star catalog data, generates a center coordinate based on the position information of a characteristic star point at the image center point, and generates a field size based on the position information of the characteristic star points at the edge positions. The field size represents a scope of a star map that can be viewed by the electronic camera 3.

Figure 3:
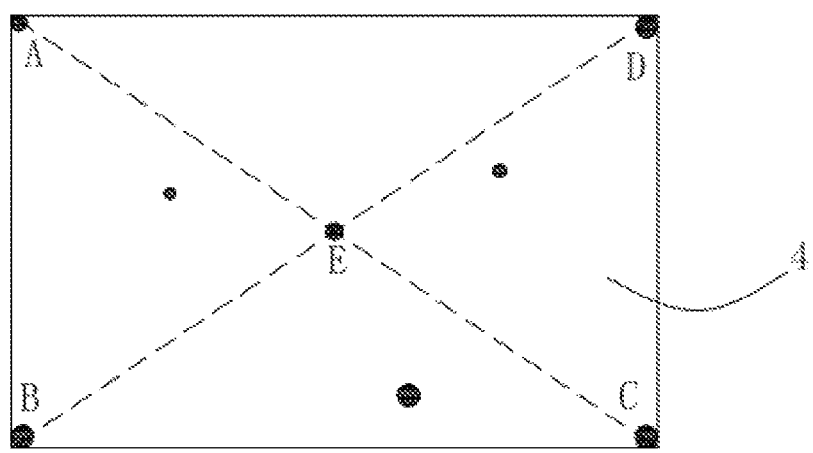
FIG. 3 illustrates a display image of the astronomical telescope stand according to the embodiment of the present application.

In an embodiment, referring to FIG. 3, an image in the block is an image captured by the electronic camera 3. The image information parsing module can identify the star points A, B, C, D, E at the edge of the block, in which the star points A, B, C, D are located at four corners of the block respectively. The positions of the star points A, B, C, D may be searched in the star catalog data, and a rectangular star sky area surrounded by the star points A, B, C, D is the field size. The star point E is located at the center of the rectangular block, and thus the position of the star point E is the center coordinate of the image.

The electronic image generation module 62 calculates a star sky scope that can be viewed by the electronic camera 3 at present based on the center coordinate and the field size, and acquires the star point data in the star sky scope from the star catalog data from the storage module 64 based on the star sky scope.

In some embodiments, the electronic image generation module 62 may communicate with the astronomical information database via Internet. The astronomical information database stores a simulated star map of whole or partial sky area. The electronic image generation module 62 can acquire the simulated star map from the astronomical information database based on the image parameters and displays the simulated star map on the display screen 4.

Because the image information parsing module requires some time to parse the image, if the electronic image generation module 62 displays a simulated star map based only on the center coordinate and the field size obtained by the parsing of the image information parsing module, the simulated star map cannot be updated in time, which will affect the observation effect. When observing the stars by using a telescope, the orientation of the telescope will be changed as stars to be observed. The orientation of the telescope may be changed manually by the observer, or automatically by means of rotating of the telescope under driving of a finderscope. The encoder 5 includes a first encoder and a second encoder. In changing of the orientation of the telescope, the first encoder can detect a rotating angle of the electronic camera 3 in the horizontal direction, and the second encoder can detect a deflecting angle of the electronic camera 3 in the vertical direction. The coordinate correction module can obtain the deflecting angle of the electronic camera 3, correct the center coordinate based on the rotating angle, and output the corrected center coordinate to the electronic image generation module 62. The deflecting angle described above refers to a rotating angle of the electronic camera 3 in the horizontal direction and a deflecting angle of the electronic camera 3 in the vertical direction.

Specifically, the coordinate update module 63 includes a deflecting angle acquisition unit and an angle conversion unit. The deflecting angle acquisition unit is configured to obtain a deflecting angle of the electronic camera 3. Since a deflecting angle is expressed as a horizontal coordinate, and a center coordinate is expressed as an equatorial coordinate, the angle conversion unit is configured to convert a deflecting angle to a deflecting angle of the center point in a form of the equatorial coordinate, and correct the center coordinate based on the deflecting angle of the center point.

A horizontal coordinate may be converted to an equatorial coordinate as follows:

d: the number of days since 0:00 in 2000;

long: local geographic longitude;
UT: universal time (unit: hour);
LST: local time;
HA: hour angle;
RA: right ascension;
DEC: declination;
LAT: geographic latitude;
ALT: angle of altitude;
AZ: azimuth angle;

$LST = 100.46 + 0.985647d + \text{long} + 15UT$ $HA = LST - RA$ $ALT = \arcsin(\sin(DEC) + \sin(LAT) + \cos(DEC)\cos(LAT)\cos(HA))$ If $\sin(HA) < 0$, $AZ = \arccos\left(\frac{(\sin(DEC) - \sin(ALT)\sin(LAT))}{\cos(ALT)\cos(LAT)}\right);$ If $\sin(HA) > 0$, $AZ = 360 - \arccos\left(\frac{(\sin(DEC) - \sin(ALT)\sin(LAT))}{\cos(ALT)\cos(LAT)}\right).$ ALT and AZ can reflect the center coordinate.

Although the accuracy of the center coordinate calculated by the image information parsing module is higher than that of the center coordinate calculated by the coordinate correction module, the image information parsing module requires some time to parse the image, while the coordinate correction module calculates the center coordinate faster. Therefore, when the center coordinate output by the image information parsing module is not received, the electronic image generation module 62 generates a simulated star map based on the center coordinate output by the coordinate correction module and the field size. When the center coordinate output by the image information parsing module is received, a simulated star map is generated based on the center coordinate output by the image information parsing module and the field size.

By realizing the real-time update of the simulated star map, and calibrate a simulated star map based on the image center coordinate and the field size obtained by the image information parsing module at a predetermined time, the matching degree between the simulated star map and the image captured by the electronic camera 3 can be improved, and the observation accuracy also can be improved.

A display mode of the display screen 4 can be a panoramic mode, an AR mode, and a comparison mode.

In the panoramic mode, the observer can rotate the telescope to drive the electronic camera 3 to rotate, and thus can see a star map changing with rotating of the telescope on the display screen 4. Because the change of the star map corresponds to the operation of rotating the telescope by the user, the simulated star map displayed on the display screen 4 corresponds to the star sky observed by the telescope. In this way, the user can observe the stars with the telescope in the daytime. In addition, it also can be used to practice operating of the telescope or learn astronomical knowledge, and have teaching value of the telescope or astronomical knowledge.

In the AR mode, the image displayed on the display screen 4 can include information of stars observed by the telescope. The star information include, but is not limited to, the astronomical serial number of the star point, the name of the star point, the astronomical coordinate of the star point, the brightness of the star point, the profile of the constellation, the name of the constellation and etc. The AR mode also includes a mixed reality display. In addition to the above annotation information, the output image also can be a star map with enhanced brightness that is obtained according to the real-time orientation of the telescope, so that the stars are brighter and easy to be observed.

In the comparison mode, the processor 6 can interconnect with processors 6 on other stands, so that the processor 6 can obtain simulated star maps obtained by other stands, and the display screen 4 can display the simulated star maps obtained locally and by other interconnected stands at the same time. Thus, the observer can observe stars from different positions in this way for comparison study.

In some embodiments, in the comparison mode, the display screen can also include at least two display areas, one of which is used to display a simulated star map, and the other one of which is used to display an image captured by the electronic camera or captured by the telescope mounted on the stand.

Figure 4:
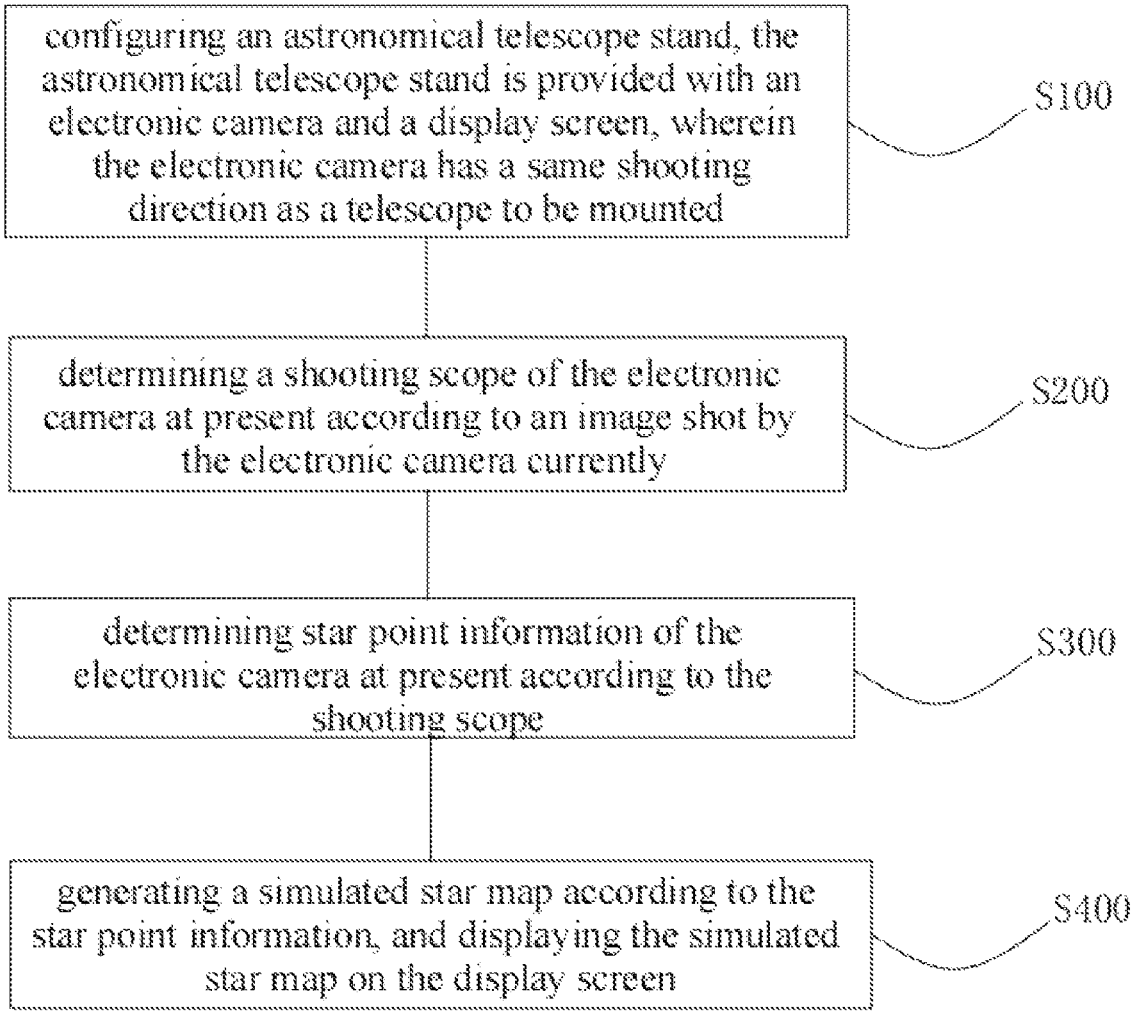
FIG. 4 illustrates a flowchart of an auxiliary calibration method for an astronomical telescope according to an embodiment of the present application.

In an aspect, an embodiment of the present application provides an auxiliary calibration method for the astronomical telescope, referring to FIG. 4, which includes the following steps.

Step S100: configuring an astronomical telescope stand, the astronomical telescope stand is provided with an electronic camera 3 and a display screen 4, wherein the electronic camera 3 has a same shooting direction as a telescope to be mounted;

Step S200: determining a shooting scope of the electronic camera 3 at present according to an image shot by the electronic camera 3 currently;

Step S300: determining star point information of the electronic camera 3 at present according to the shooting scope; and Step S400: generating a simulated star map according to the star point information, and displaying the simulated star map on the display screen 4.

In an aspect, the present application also provides an astronomical telescope system, including a telescope and a telescope stand for mounting the telescope as provided above in the embodiments of the present application. Based on the full disclosure of the astronomical telescope stand, those skilled in the art can obtain the astronomical telescope system, which thus will not be described in detail herein.

What is provided above is the preferred embodiments according to the present application, and the protection scope of the present application is not limited to the above embodiments. Therefore, all equivalent changes made according to the structure, the shape and the principle of the present application should be considered as falling within the protection scope of the present application.

List of Reference signs: 1. first rotating shaft; 2. second rotating shaft; 3. electronic camera; 4. display screen; 5. encoder; 6. processor; 61. image information parsing module; 62. electronic image generation module; 63. coordinate update module; 64. storage module.

What is claimed is:

1. An astronomical telescope stand, comprising:
    at least two rotating shafts perpendicular to each other, wherein each rotating shaft is provided with an encoder;
    an electronic camera having a same shooting direction as a telescope to be mounted;
    a display screen;
    a processor, which is connected with the encoders, the electronic camera and the display screen;
    wherein the processor comprises:

an image information parsing module, configured to calculate a center coordinate and a field size of an image captured by the electronic camera;

an electronic image generation module, configured to generate a simulated star map based on the center coordinate and the field size; and a coordinate correction module, configured to correct the center coordinate based on a deflecting angle of the electronic camera obtained by the encoders to update the simulated star map; and wherein the simulated star map is displayed on the display screen.

2. The astronomical telescope stand according to claim 1, wherein, the simulated star map comprises at least one of an astronomical serial number of a star point, a name of the star point, an astronomical coordinate of the star point, brightness of the star point, a profile of a constellation or a name of the constellation.

3. The astronomical telescope stand according to claim 1, wherein, the display screen is connected with a rotating shaft via a connecting rod, one end of the connecting rod is hinged with the rotating shaft, and a second end of the connecting rod is hinged with the display screen.

4. The astronomical telescope stand according to claim 1, wherein, the center coordinate is expressed as an equatorial coordinate, and the deflecting angle is expressed as a horizontal coordinate, and the coordinate correction module comprises:

a deflecting angle acquisition unit, configured to obtain a deflecting angle of the electronic camera;

an angle conversion unit, configured to convert the deflecting angle to a center point deflecting angle in a form of the equatorial coordinate, and correct the center coordinate based on the center point deflecting angle to obtain a corrected center coordinate; and wherein the coordinate correction module transmits the corrected center coordinate to the electronic image generation module.

5. The astronomical telescope stand according to claim 1, further comprising a storage module that pre-stores star catalog data, wherein the star catalog data at least comprises: an astronomical serial number of a star point, a name of the star point, an astronomical coordinate of the star point, brightness of the star point, a profile of a constellation, and a name of the constellation; and wherein the electronic image generation module is configured to calculate a star sky scope that is viewed by the electronic camera currently based on the center coordinate and the field size, and acquire the star catalog data from the storage module based on the star sky scope, to acquire star point data related in the star sky scope.

6. The astronomical telescope stand according to claim 1, wherein, display modes of the display screen comprises a panoramic mode, an augmented reality (AR) mode and a comparison mode;

in the comparison mode, the display screen comprises at least two display areas, and one display area is used to display the simulated star map, and a second display area is used to display the image captured by the electronic camera or an image captured by the telescope mounted on the astronomical telescope stand.

7. The astronomical telescope stand according to claim 1, wherein, the electronic image generation module is configured to:

generate the simulated star map based on the center coordinate and the field size output by the image information parsing module when the center coordinate output by the image information parsing module is received; and generate a simulated star map based on a center coordinate and a field size output by the coordinate correction module when the center coordinate output by the image information parsing module is not received.

8. The astronomical telescope stand according to claim 1, wherein, the processor is in communication with an astronomical information database via Internet, or in communication with processors of other astronomical telescopes; the processor is configured to acquire or generate a required simulated star map by means of the astronomical information database communicated via Internet, or acquire or generate the required simulated star map from other astronomical telescopes communicated with the processor.

9. An astronomical telescope system, comprising a telescope and a telescope stand for mounting the telescope, wherein the telescope stand comprises:

at least two rotating shafts perpendicular to each other, wherein each rotating shaft is provided with an encoder;

an electronic camera having a same shooting direction as the telescope to be mounted;

a display screen;

a processor, which is connected with the encoders, the electronic camera and the display screen;

wherein the processor comprises:

an image information parsing module, configured to calculate a center coordinate and a field size of an image captured by the electronic camera;

an electronic image generation module, configured to generate a simulated star map based on the center coordinate and the field size; and a coordinate correction module, configured to correct the center coordinate based on a deflecting angle of the electronic camera obtained by the encoders to update the simulated star map; and wherein the simulated star map is displayed on the display screen.

10. The astronomical telescope system according to claim 9, wherein, the simulated star map comprises at least one of an astronomical serial number of a star point, a name of the star point, an astronomical coordinate of the star point, brightness of the star point, a profile of a constellation or a name of the constellation.

11. The astronomical telescope system according to claim 9, wherein, the display screen is connected with a rotating shaft via a connecting rod, one end of the connecting rod is hinged with the rotating shaft, and a second end of the connecting rod is hinged with the display screen.

12. The astronomical telescope system according to claim 9, wherein, the center coordinate is expressed as an equatorial coordinate, and the deflecting angle is expressed as a horizontal coordinate, and the coordinate correction module comprises:

a deflecting angle acquisition unit, configured to obtain a deflecting angle of the electronic camera;

an angle conversion unit, configured to convert the deflecting angle to a center point deflecting angle in a form of the equatorial coordinate, and correct the center coordinate based on the center point deflecting angle to obtain a corrected center coordinate; and wherein the coordinate correction module transmits the corrected center coordinate to the electronic image generation module.

13. The astronomical telescope system according to claim 9, wherein, further comprising a storage module that pre-stores star catalog data, wherein the star catalog data at least comprises: an astronomical serial number of a star point, a name of the star point, an astronomical coordinate of the star point, brightness of the star point, a profile of a constellation, and a name of the constellation; and
wherein the electronic image generation module is configured to calculate a star sky scope that is viewed by the electronic camera currently based on the center coordinate and the field size, and acquire the star catalog data from the storage module based on the star sky scope, to acquire star point data related in the star sky scope.

14. The astronomical telescope system according to claim 9, wherein, display modes of the display screen comprises a panoramic mode, an augmented reality (AR) mode and a comparison mode;
in the comparison mode, the display screen comprises at least two display areas, and one display area is used to display the simulated star map, and a second display area is used to display the image captured by the electronic camera or an image captured by the telescope mounted on the telescope stand.

15. The astronomical telescope system according to claim 9, wherein, the electronic image generation module is configured to:
generate the simulated star map based on the center coordinate and the field size output by the image information parsing module when the center coordinate output by the image information parsing module is received; and
generate a simulated star map based on a center coordinate and a field size output by the coordinate correction module when the center coordinate output by the image information parsing module is not received.

16. The astronomical telescope system according to claim 9, wherein, the processor is in communication with an astronomical information database via Internet, or in communication with processors of other astronomical telescopes; the processor is configured to acquire or generate a required simulated star map by means of the astronomical information database communicated via Internet, or acquire or generate the required simulated star map from other astronomical telescopes communicated with the processor.

* * * * *

UNITED STATES PATENT AND TRADEMARK OFFICE
CERTIFICATE OF CORRECTION

| | |
|---|---|
| PATENT NO. | : 12,106,519 B2 |
| APPLICATION NO. | : 17/749328 |
| DATED | : October 1, 2024 |
| INVENTOR(S) | : Hongyun Qiu |

It is certified that error appears in the above-identified patent and that said Letters Patent is hereby corrected as shown below:

On the Title Page

At Column 1, item (73) Assignee, "Light Soeed Vision (Beijing) Co., Ltd." should read -- Light Speed Vision (Beijing) Co., Ltd. --.

Signed and Sealed this
Fifth Day of November, 2024

Katherine Kelly Vidal
*Director of the United States Patent and Trademark Office*